G. A. PATTILLO.
NUT LOCK.
APPLICATION FILED JAN. 14, 1909.
943,887.
Patented Dec. 21, 1909.
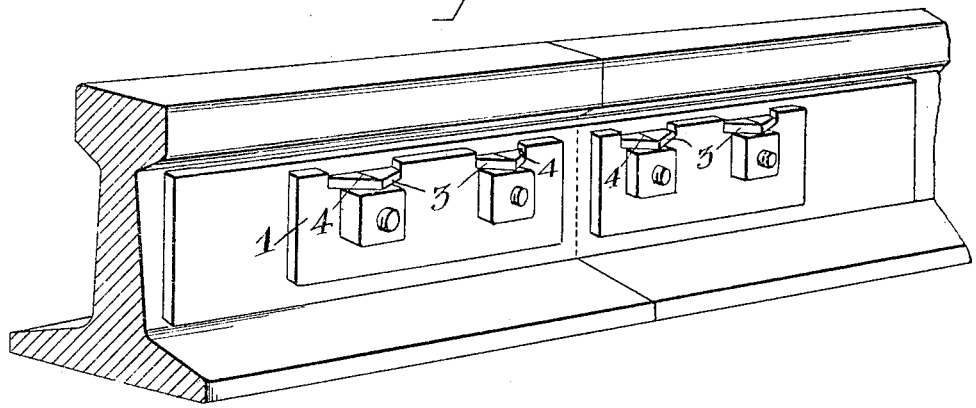
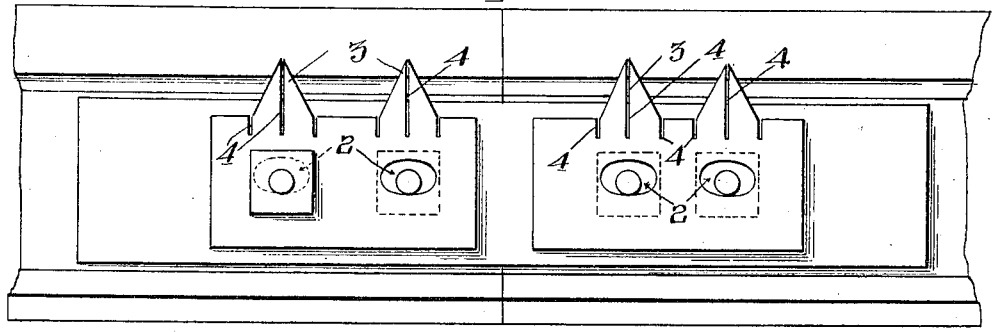
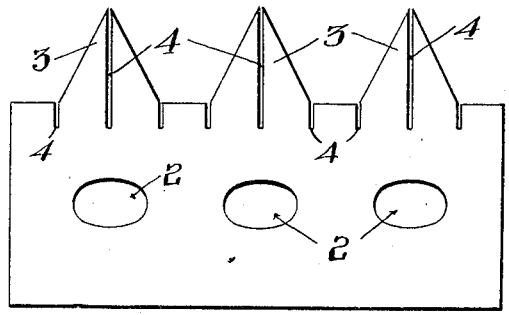
Witnesses
Inventor
G. A. Pattillo.
by
Attorneys

UNITED STATES PATENT OFFICE.

GEORGE A. PATTILLO, OF CARTERSVILLE, GEORGIA.

NUT-LOCK.

943,887.  Specification of Letters Patent.  Patented Dec. 21, 1909.

Application filed January 14, 1909. Serial No. 472,318.

*To all whom it may concern:*

Be it known that I, GEORGE A. PATTILLO, a citizen of the United States, residing at Cartersville, in the county of Bartow and State of Georgia, have invented certain new and useful Improvements in Nut-Locks; and I do declare the following to be a full, clear, and exact description of the invention, such as will enable others skilled in the art to which it appertains to make and use the same.

This invention relates to improvements in nut locks.

The object of the invention is to provide a simple, inexpensive and improved form of nut lock, whereby the nuts of two or more bolts may be securely locked and held against any turning movement.

A further object is to provide a nut lock of this character especially adapted for use in connection with the fish plate bolts of railway rails, whereby the nuts thereon are secured and which are not being affected by the expansion and contraction of the rails.

With these and other objects in view, the invention consists of certain novel features of construction, combination and arrangement of parts, as will be more fully described and particularly pointed out in the appended claim.

In the accompanying drawings, Figure 1 is a perspective view of the meeting ends of two railway rails showing the application of the invention thereto; Fig. 2 is a side view of the rail ends showing the locking device as engaged with the bolts before the nuts are applied thereto; and Fig. 3 is a plan view of the modified form of locking device.

In the embodiment of my invention I provide a washer plate 1 which may be of any suitable length and is provided with two or more elongated bolt holes 2, said holes being preferably arranged in longitudinal alinement with the longer axis thereof in line with the length of the plate.

On one edge of the washer plate 1 opposite each of the bolt holes is formed a triangular locking lug 3 each of said lugs being preferably slitted or cut in from its apex toward the plate, as shown at 4, said slits or cuts extending a slight d'stance beyond the edge of the plate. At the base of each of the lugs 3, at the point where the inclined edges of the lugs join the edge of the plate, the latter is slitted or cut inwardly to a slight extent. The purpose of thus slitting the lugs and plate will hereinafter be described.

In applying the lock to the bolts, the latter are inserted through the elongated holes 2 after which the nuts are secured on to the ends of the bolts and into rigid engagement with the plates 1, said nuts being turned so that one of their square sides or edges will be parallel with the edge of the plate 1. After the nuts have thus been screwed up the lugs 3 are bent inwardly into engagement with the adjacent side or edge of the nut thus securely holding the latter against movement. By slitting the lugs through the center they may be more read'ly bent into engagement with the nut and by slitting the plate as described, the lugs may be bent into closed engagement with the nut should the latter not be of sufficient size to reach entirely to the edge of the plate. By slitting the plate a portion of the same may be bent down with the lug into engagement with the side of the nut thus permitting the ent're surface of the lug to be brought into engagement with the side of the nut.

In Figs. 1 and 2 of the drawing the nut lock is shown as constructed for use in connection with the ends of railway rails employing two fastening bolts, while in Fig. 3 of the drawing the invention is illustrated for use in connection with three bolts, and it will be obvious that the same may be constructed for use in connection with two or more bolts. By forming separate washer plates for each end of the rails and providing elongated apertures or bolt holes therein the rails are free to expand and contract.

When the rail joint must be separated for any reason, a wrench is applied and the nut turned as is usual. This will force the lugs out of the way and after the first turn of the nut, it will be permitted to freely revolve on the bolt.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

Having thus particularly described and ascertained the nature of my invention, what I claim as new and desire to secure by Letters-Patent, is:—

A nut lock comprising a washer plate of uniform width having a plurality of closed oval bolt receiving apertures, said apertures having a minor axis greater than the diameter of the bolts which pass therethrough so as to permit vertical and longitudinal adjustment of the washer plate, triangular shaped lugs extending from its upper edge at points immediately above said apertures, said lugs being formed by an extension of the body and each having a slot extending from its apex to a point below the upper edge of the plate, and the upper edge of the plate being slit on opposite sides of the lugs whereby the latter may be bent downwardly and outwardly in a horizontal position against the upper edge of the nuts but may be bent out of nut engaging position by unscrewing the nut with a wrench.

In testimony whereof I have hereunto set my hand in presence of two subscribing witnesses.

GEORGE A. PATTILLO.

Witnesses:
O. A. NEEL,
O. W. HANEY.